United States Patent
Monroe et al.

(10) Patent No.: US 10,876,627 B1
(45) Date of Patent: Dec. 29, 2020

(54) GEAR RATIO GRADIENT SPECIFIED VEHICLE ACCELERATIONS FOR OPTIMIZED SHIFT FEEL

(71) Applicants: Ryan J Monroe, Troy, MI (US); Mustafa Acar, Sterling Heights, MI (US); Avinash Jonnalagadda, Farmington Hills, MI (US); Bruce K Geist, Sterling Heights, MI (US); Timothy J White, Ann Arbor, MI (US); Cory E Bruckner, Ypsilanti, MI (US)

(72) Inventors: Ryan J Monroe, Troy, MI (US); Mustafa Acar, Sterling Heights, MI (US); Avinash Jonnalagadda, Farmington Hills, MI (US); Bruce K Geist, Sterling Heights, MI (US); Timothy J White, Ann Arbor, MI (US); Cory E Bruckner, Ypsilanti, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/580,867

(22) Filed: Sep. 24, 2019

(51) Int. Cl.
*F16H 61/02* (2006.01)
*F16H 61/04* (2006.01)
*F16H 61/00* (2006.01)

(52) U.S. Cl.
CPC ..... *F16H 61/0437* (2013.01); *F16H 61/0204* (2013.01); *F16H 2061/0071* (2013.01)

(58) Field of Classification Search
CPC ............. F16H 61/0437; F16H 61/0204; F16H 2061/0071
See application file for complete search history.

(56) References Cited

U.S. PATENT DOCUMENTS

| 6,364,811 | B1 | 4/2002 | Hubbard et al. |
| 7,390,284 | B2 | 6/2008 | Wheals |
| 8,170,764 | B2 | 5/2012 | Kaminsky et al. |
| 8,332,109 | B2 | 12/2012 | Otanez et al. |
| 8,489,293 | B2 | 7/2013 | Heap et al. |
| 2016/0069453 | A1* | 3/2016 | Atmaram ............ F16H 61/0437 192/3.61 |
| 2018/0087662 | A1* | 3/2018 | Baumann ............... B60K 23/02 |
| 2018/0099671 | A1* | 4/2018 | Bang ....................... B60K 6/52 |

* cited by examiner

*Primary Examiner* — Justin Holmes
(74) *Attorney, Agent, or Firm* — Ralph E Smith

(57) ABSTRACT

Calibration and simulation techniques for modeled gear shift events of an automatic transmission of a vehicle comprise obtaining a set of parameters for a modeled gear shift event of the transmission and, based on the set of parameters, modeling forward/aft vehicle acceleration caused by the modeled gear shift event. A shift quality rating system is the utilized to obtain a shift quality rating of the modeled gear shift event based on at least one of the set of parameters and the modeled forward/aft vehicle acceleration. Finally, the techniques determine whether the determined shift quality rating satisfies a shift quality rating threshold and, when the determined shift quality rating fails to satisfy the shift quality rating threshold, a gear ratio gradient for the modeled gear shift event is adjusted and the process is repeated until the determined shift quality rating satisfies the shift quality rating threshold.

17 Claims, 4 Drawing Sheets

GEAR RATIO GRADIENT SPECIFIED VEHICLE ACCELERATIONS FOR OPTIMIZED SHIFT FEEL

FIELD

The present application generally relates to transmission simulation and calibration systems and, more particularly, to techniques for gear ratio gradient specified vehicle accelerations for optimized shift feel.

BACKGROUND

An automatic transmission comprises a system of gears and clutches that are collectively configured to transfer drive torque from a torque generating system (e.g., an internal combustion engine, an electric motor, or combinations thereof) to a driveline of a vehicle. A fluid coupling (e.g., a torque converter) may selectively couple an output shaft of the torque generating system to an input shaft of the transmission. During a shift event between two gear ratios of the transmission, on-coming and off-going clutches are controlled based on specific torque and slip profiles. Conventional transmission control systems are limited by vehicle-specific hardware and software architectures. More specifically, these systems are unable to achieve comprehensive and systematic characterization and parameterization of all feasible shift calibrations. Accordingly, while such transmission control systems do work well for their intended purpose, an opportunity exists to provide more robust, fast-to-market transmission control calibrations that could produce improved transmission shift quality, vehicle drivability, and/or vehicle fuel economy.

SUMMARY

According to one example aspect of the invention, a calibration system for an automatic transmission of a vehicle is presented. In one exemplary implementation, the calibration system comprises: an interface configured for communication with a controller of the vehicle, the controller being configured to control the transmission of the vehicle and a computing system connected to the interface and configured to: obtain a set of parameters for a modeled gear shift event of the transmission, the set of parameters being indicative of at least interactions between on-coming and off-going clutches of the transmission during the modeled gear shift event, based on the set of parameters, model forward/aft vehicle acceleration caused by the modeled gear shift event, using a shift quality rating system, determine a shift quality rating of the modeled gear shift event based on at least one of the set of parameters and the modeled forward/aft vehicle acceleration, determine whether the determined shift quality rating satisfies a shift quality rating threshold, and when the determined shift quality rating satisfies the shift quality rating threshold, calibrate, via the interface, at least one of clutch torque and slip profiles for controlling on-coming and off-going clutches of the transmission during gear shift events based on the set of parameters for the modeled shift event.

In some implementations, the set of parameters comprises a gear ratio gradient indicative of a slope or rate of change of the gear ratio of the transmission during an inertia phase of the modeled gear shift event. In some implementations, the computing system is further configured to determine whether the modeled forward/aft vehicle acceleration satisfies a vehicle acceleration threshold indicative of an acceptable amount of jerk during the modeled gear shift event. In some implementations, the computing system is further configured to when the modeled forward/aft vehicle acceleration satisfies the vehicle acceleration threshold, determine the shift quality rating of the gear shift event, and when the modeled forward/aft vehicle acceleration fails to satisfy the vehicle acceleration threshold, modify the set of parameters including at least decreasing the gear ratio gradient for the modeled gear shift event and then remodel the forward/aft vehicle acceleration. In some implementations, the computing system is further configured to remodel the forward/aft vehicle acceleration based on the modified set of parameters when the determined shift quality fails to satisfy the shift quality rating threshold.

In some implementations, the computing system is configured to model the forward/vehicle acceleration caused by the modeled gear shift event by based on the set of parameters, modeling a three-dimensional powertrain acceleration caused by the modeled gear shift event and projecting the modeled three-dimensional powertrain acceleration onto a forward-motion vehicle direction vector to obtain the modeled forward/aft vehicle acceleration. In some implementations, the computing system is configured to model the three-dimensional powertrain acceleration based further on a known powertrain mounting and driveline architecture of the vehicle. In some implementations, the set of parameters are also indicative of a behavior of a torque converter during the modeled gear shift event, wherein the torque converter is configured to selectively couple a torque generating system of the vehicle to an input shaft of the transmission. In some implementations, the shift quality rating system is a neural network based shift quality rating system.

According to another example aspect of the invention, a simulation system for modeling gear shift events of a simulated automatic transmission of a simulated vehicle is presented. In one exemplary implementation, the simulation system comprises: a shift quality rating system configured to determine a shift quality rating of a modeled gear shift event of the transmission and a computing system configured to perform a simulation process to model a gear shift event of the transmission, the simulation process comprising: obtaining, from a user, a set of parameters for the modeled gear shift event of the transmission, the set of parameters being indicative of at least interactions between on-coming and off-going clutches of the transmission during the modeled gear shift event and comprising at least a gear ratio gradient indicative of a slope or rate of change of the gear ratio of the transmission during an inertia phase of the modeled gear shift event, based on the set of parameters, modeling forward/aft vehicle acceleration caused by the modeled gear shift event, obtaining, from the shift quality rating system, a shift quality rating of the modeled gear shift event based on at least one of the set of parameters and the modeled forward/aft vehicle acceleration, determining whether the determined shift quality rating satisfies a shift quality rating threshold, and when the determined shift quality rating fails to satisfy the shift quality rating threshold, adjusting the gear ratio gradient and repeating the simulation process until the determined shift quality rating satisfies the shift quality rating threshold.

In some implementations, the simulation process further comprises determining whether the modeled forward/aft vehicle acceleration satisfies a vehicle acceleration threshold indicative of an acceptable amount of jerk during the modeled gear shift event. In some implementations, the simulation process further comprises when the modeled forward/aft vehicle acceleration satisfies the vehicle acceleration threshold, determining the shift quality rating of the gear shift event and when the modeled forward/aft vehicle acceleration fails to satisfy the vehicle acceleration threshold, modifying the set of parameters including at least decreasing the gear ratio gradient for the modeled gear shift event and then remodel the forward/aft vehicle acceleration. In some implementations, the simulation process comprises remodeling the forward/aft vehicle acceleration based on the modified set of parameters when the determined shift quality fails to satisfy the shift quality rating threshold.

In some implementations, modeling the forward/vehicle acceleration caused by the modeled gear shift event comprises based on the set of parameters, modeling a three-dimensional powertrain acceleration caused by the modeled gear shift event and projecting the modeled three-dimensional powertrain acceleration onto a forward-motion vehicle direction vector to obtain the modeled forward/aft vehicle acceleration. In some implementations, modeling the three-dimensional powertrain acceleration is based further on a powertrain mounting and driveline architecture of the vehicle. In some implementations, the set of parameters are also indicative of a behavior of a simulated torque converter during the modeled gear shift event, wherein the torque converter is configured to selectively couple a torque generating system of the vehicle to an input shaft of the transmission. In some implementations, the shift quality rating system is a neural network based shift quality rating system.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, an opportunity exists to provide more robust, fast-to-market transmission control calibrations that could produce improved transmission shift quality, vehicle drivability, and/or vehicle fuel economy. Accordingly, improved simulation and calibration systems and methods for an automatic transmission of a vehicle are presented. The systems and methods allow calibrators or engineers to define how the transmission gear ratio transition should occur in order to potentially enhance drive/shift quality, vehicle drivability (e.g., acceleration), and/or fuel economy. A set of parameters for a modeled gear shift event is initially received and includes at least a gear ratio gradient indicative of a slope or rate of change of the transmission gear ratio during the modeled gear shift event. Forward/aft vehicle acceleration is modeled based on this set of parameters and, when a vehicle acceleration threshold is satisfied, a shift quality rating of the modeled gear shift event is determined. When the shift quality rating satisfies a shift quality rating threshold, the set of parameters could be used, for example, to calibrate the vehicle transmission controller, e.g., clutch torque and/or slip profiles.

Figure 1:
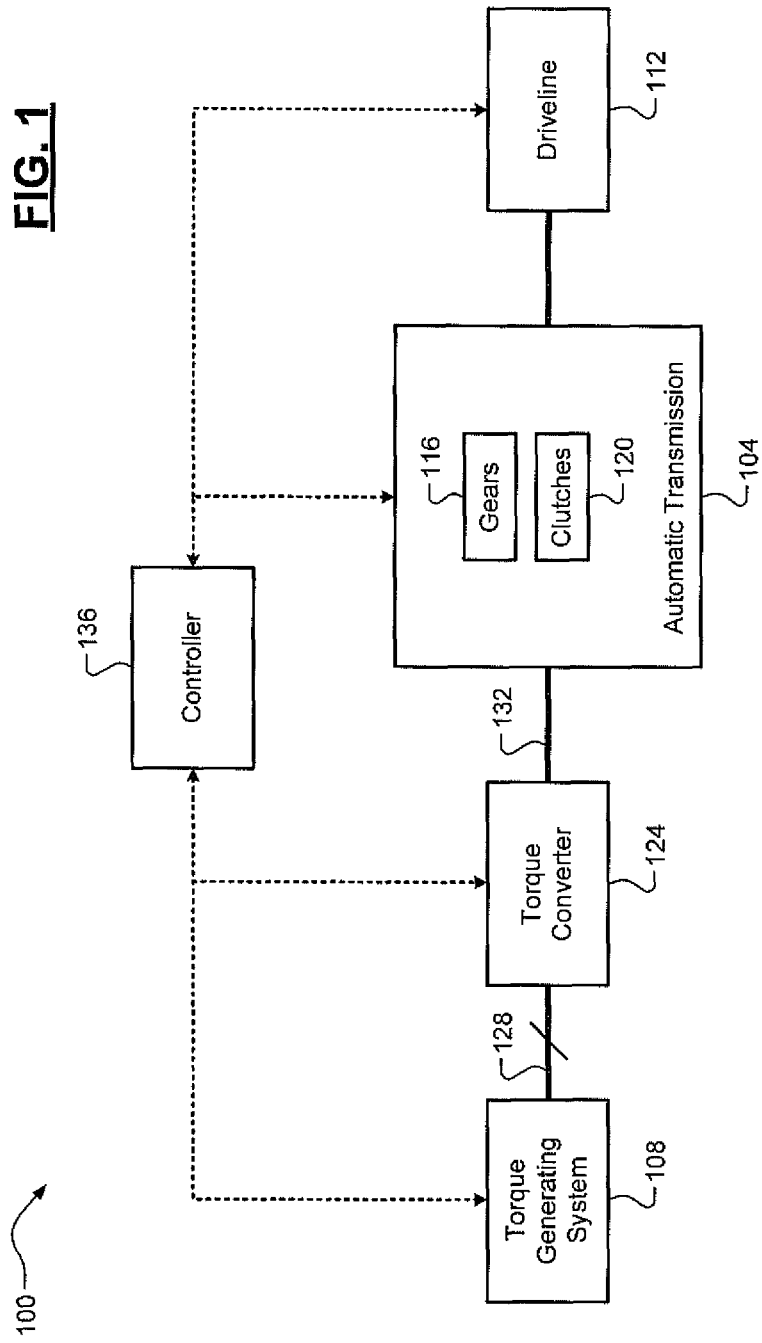
FIG. 1 is a functional block diagram of an example vehicle having an automatic transmission according to the principles of the present disclosure.

Referring now to FIG. 1, a functional block diagram of an example vehicle 100 according to the principles of the present disclosure is illustrated. The vehicle 100 comprises an automatic transmission 104 that is configured to transfer drive torque from a torque generating system 108 of the vehicle 100 to a driveline 112 of the vehicle 100 for vehicle propulsion. Non-limiting examples of the torque generating system 108 include an internal combustion engine, an electric motor, and combinations thereof. The transmission 104 comprises a system of gears 116 (e.g., one or more planetary gear sets) and clutches 120 that are collectively controlled to achieve a desired gear ratio for the transfer of drive torque from the torque generating system 108 to the driveline 112 via the transmission 104. A fluid coupling or torque converter 124 is configured to selectively couple an output shaft 128 of the torque generating system 108 to an input shaft 132 of the transmission 104. A controller 136 controls operation of the vehicle 100, including controlling the torque generating system 108 to generate a desired drive torque (e.g., to meet a driver torque request) and controlling the transmission 104 to achieve a desired gear ratio.

Figure 2:
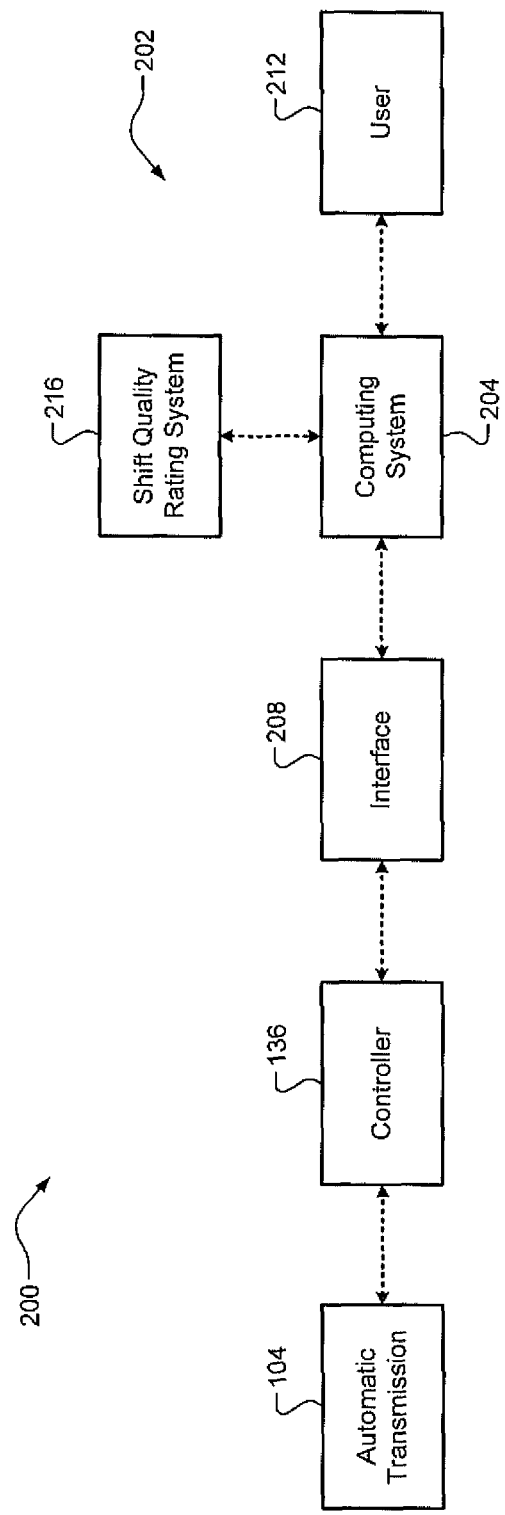
FIG. 2 is a functional block diagram of an example calibration system for an automatic transmission of a vehicle according to the principles of the present disclosure.

Referring now to FIG. 2, a functional block diagram of an example calibration system 200 for the transmission 104 is illustrated. The calibration system 200 generally includes a computing system 204 that is configured to communicate with the controller 136 via an interface 208. The interface 208 could be any suitable wired or wireless interface that provides for electronic communication between the controller 136 and the computing system 204. Specifically, the computing system 204 is configured to transmit or upload shift parameters (e.g., clutch torque/slip profiles) to the controller 136, which the controller 136 could then store in memory and utilize to control gear shift events of the transmission 104. The computing system 204 receives a set of parameters for a modeled shift event as input from a user 212 (a calibrator, an engineer, etc.). It will also be appreciated that the computing system 204 could receive at least a portion of this input from another computing system or network (e.g., an upload of data). The computing system 204 is also configured to communicate with a shift quality rating system 216 that is configured to determine a shift quality rating of a modeled shift event. While shown as a separate or external system, it will be appreciated that the shift quality rating system 216 could reside on the computing system 204 (e.g., as software executable by the computing system 204). The computing system 204 and the shift quality rating system 216 could also be referred to as a simulation system 202. In other words, the user 212 could utilize the simulation system 202 to simulate shift events for any simulated vehicle/transmission.

Figure 3A:
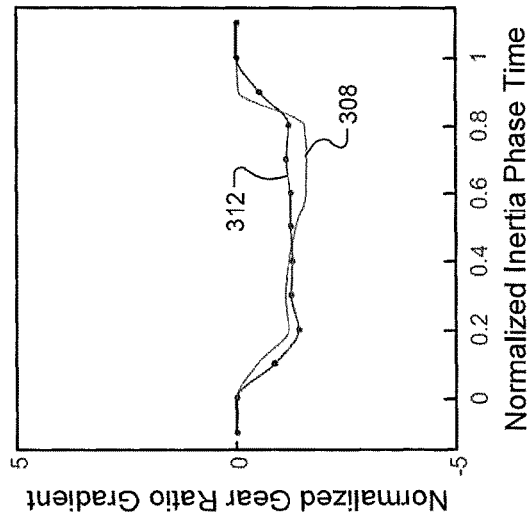
FIGS. 3A-3D illustrates plots of transmission gear ratio/gear ratio gradient and clutch torque/slip during two example gear shift events according to the principles of the present disclosure.
Figure 3B:
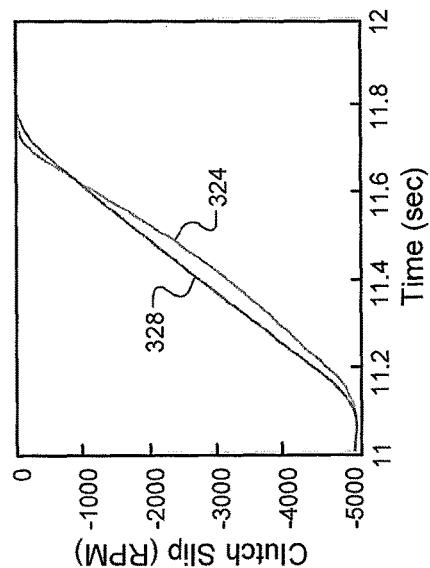

As mentioned above, the computing system 204 initially receives a set of parameters for a modeled shift event, e.g., from the user 212 and/or another computing system or network. The set of parameters comprises parameters that are indicative of interactions between on-coming and off-going clutches 120 of the transmission 104 or another simulated transmission during the modeled gear shift event. One primary parameter of the set of parameters is a gear ratio profile and/or a gear ratio gradient. FIGS. 3A-3B illustrate first and second example gear ratio profiles 300, 304 and first and second example gear ratio gradients 308, 312 (versus inertia phase time). The gear ratio gradients 308, 312 represent the slopes or rates of change of the gear ratio profiles 300, 304, respectively. As shown, the magnitudes and inertia phase time is normalized between zero and one. The set of parameters could also include, for example, clutch torque/slip profiles as well as any other suitable known parameters corresponding to the design of the transmission 104 or another simulated transmission (clutch friction materials, clutch apply pressures, etc.). In one exemplary implementation, the set of parameters further comprises at least one parameter indicative of a behavior of the torque converter 124 or another simulated torque converter during the modeled gear shift event (e.g., torque converter slip).

Based on the set of parameters, the computing system 204 models forward and aft vehicle acceleration (also referred to herein as "forward/aft vehicle acceleration") caused by the modeled gear shift event. In one exemplary implementation, the computing system 204 initially models a three-dimensional vehicle acceleration (e.g., six degrees of freedom of an engine block) caused by the modeled gear shift event based on the set of parameters. In one exemplary implementation, this initial three-dimensional modeling by the computing system 204 takes into account a known powertrain mounting and driveline compliance architecture or full longitudinal dynamics of the vehicle. This known powertrain mounting and driveline architecture could include, for example only, the type of vehicle driveline orientation (longitudinal vs. lateral engine orientation, transmission orientation, etc.) and/or other suitable known parameters, such as known parameters of the vehicle chassis. After initially modeling the three-dimensional powertrain acceleration, the computing system 204 projects the modeled three-dimensional powertrain acceleration onto a forward-motion vehicle direction vector to obtain the modeled forward and aft vehicle acceleration. This could also be described as the longitudinal vehicle acceleration (i.e., a forward or backward jerk force).

Based on this modeled forward and aft vehicle acceleration and using the shift quality rating system 216, the computing system 204 then determines a shift quality rating of the modeled gear shift event. In one exemplary implementation, before determining the shift quality rating of the modeled gear shift event, the computing system 204 could determine whether the modeled forward and aft vehicle acceleration satisfies a vehicle acceleration threshold indicative of an acceptable amount of jerk during the modeled gear shift event. This acceptable amount of jerk could be indicative of an acceptable difference between a maximum vehicle forward/aft acceleration during the inertia phase of the modeled gear shift event to a forward/aft acceleration at the end of the inertia phase. Any modeled forward/aft vehicle acceleration exceeding this vehicle acceleration threshold could be deemed to be too high of a shock or a jerk for the average driver. When the vehicle acceleration threshold is satisfied, the computing system 204 could then determine the shift quality rating using the shift quality rating system 216.

When the vehicle acceleration threshold is not satisfied, however, the set of parameters could be modified and the process could be re-run. The modification of the set of parameters could include, for example only, reducing the gear ratio gradient. Eventually, the computing system 204 determines the shift quality rating for the modeled gear shift event using the shift quality rating system 216 and at least one of the set of parameters and the modeled forward/aft vehicle acceleration. The shift quality rating system 216 could employ a trained model such as, for example only, a neural network based shift quality rating model. In one exemplary implementation, the neural network based shift quality rating model is AVL-DRIVE™, but it will be appreciated that any suitable shift quality rating system or method could be utilized. After determining the shift quality rating, the computing system 204 determines whether the determined shift quality rating satisfies a shift quality rating threshold. This shift quality rating threshold could be user-specified or could be predetermined by the shift quality rating system 216 and could, similar to the vehicle acceleration threshold, could be indicative of a shift quality rating that is deemed to be acceptable for the average driver. When the determined shift quality rating fails to satisfy the shift quality rating threshold, the set of parameters could be modified (e.g., the gear ratio gradient could be decreased) and the process could repeat.

Figure 3C:
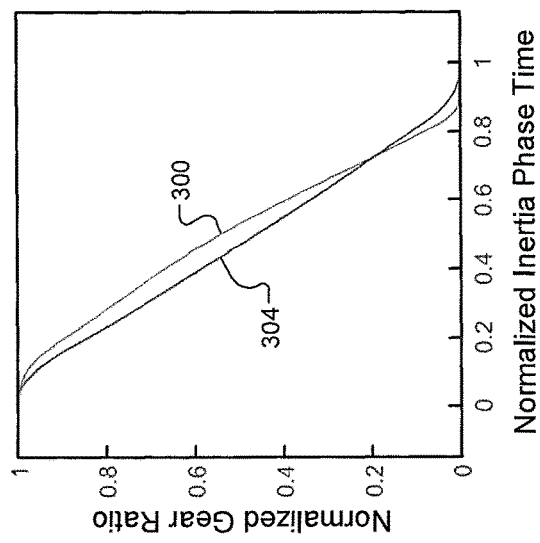
Figure 3D:
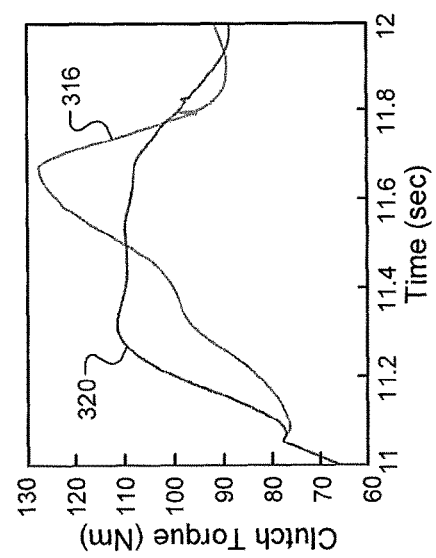

When the determined shift quality rating does satisfies the shift quality rating threshold, however, the computing system 204 is configured to calibrate, via the interface 208, clutch torque and slip profiles for controlling on-coming and off-going clutches of the transmission 104 during gear shift events based on the set of parameters for the modeled shift event. In other words, these profiles indicate how much torque is input to the on-coming and off-going clutches at varying times throughout the gear shift events and how much clutch slip is occurring at varying times throughout the gear shift events. FIGS. 3C-3D illustrate clutch torque profiles 316, 320 and clutch slip profiles 324, 328 corresponding to gear ratio profiles 300, 304 and gear ratio gradients 308, 312, respectively. It will be appreciated that the modeling of shift events and the other metrics described above could also be performed but never used to actually calibrate the controller 136. In other words, the simulation system 202 could merely be used as a design and verification tool. For example only, the simulation system 202 could be used to determine that a different powertrain mounting and driveline configuration would provide for better quality transmission shift events. It will also be appreciated that additional modeling/simulations could be performed to determine whether an even better shift quality rating could be found for a modeled shift event.

Figure 4:
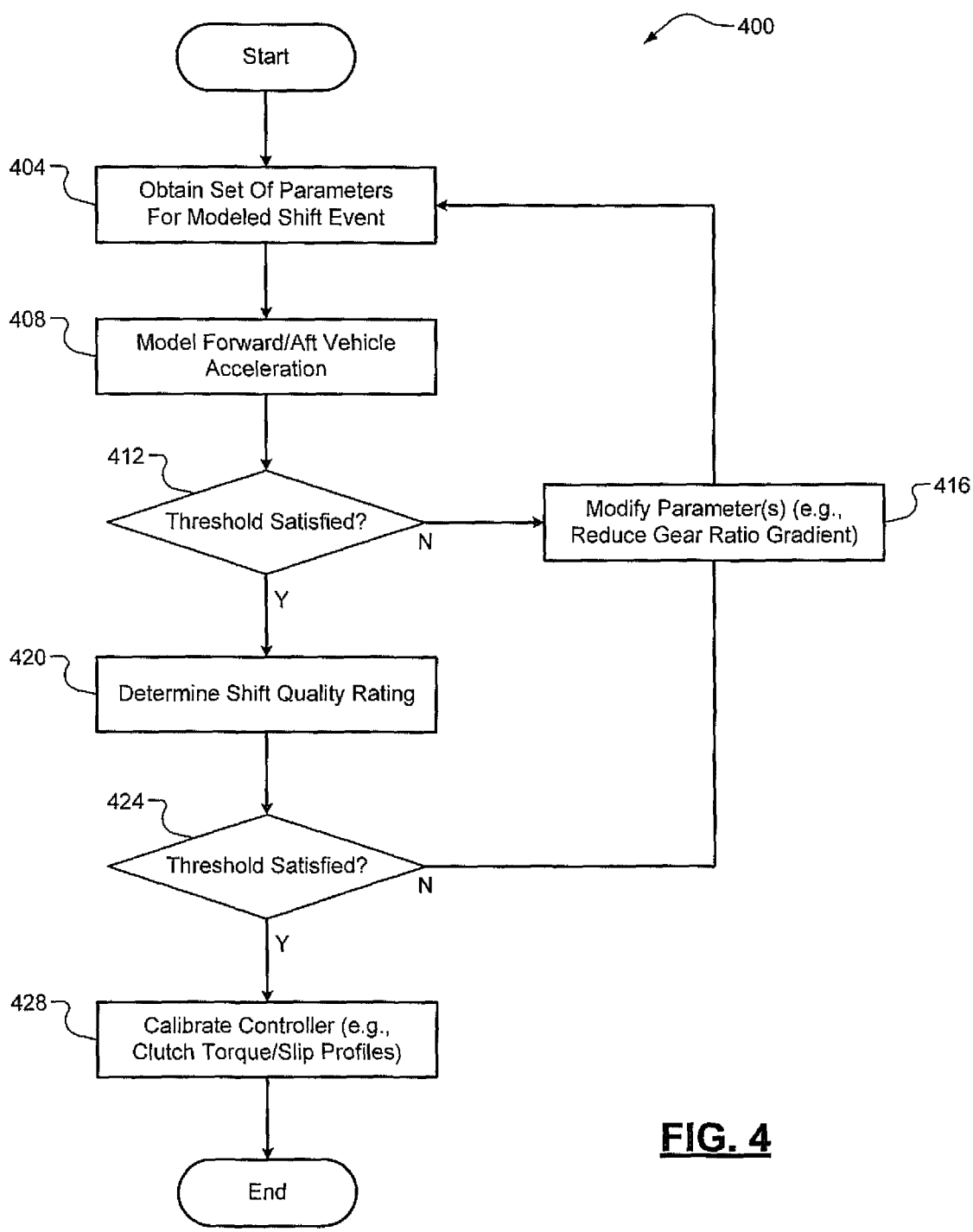
FIG. 4 is a flow diagram of an example calibration method for an automatic transmission of a vehicle according to the principles of the present disclosure.

Referring now to FIG. 4, a flow diagram of an example calibration method 400 for the transmission 104 is illustrated. At 404, the computing system 204 obtains the set of parameters for a modeled shift event. At 408, the computing system 204 models forward/aft vehicle acceleration based on the set of parameters. This could also include, for example only, identifying the inertia phase of the modeled gear shift event, which is the focus of the processes described herein. At 412, the computing system 204 determines whether the modeled forward/aft vehicle acceleration satisfies a vehicle acceleration threshold. When false, the method 400 proceeds to 416 where the parameter(s) are modified (e.g., the gear ratio gradient is reduced) and the method 400 returns to 400. When true, the method 400 proceeds to 420 where the computing system 204 determines the shift quality rating for the modified shift event using the shift quality rating system 216 and at least one of the set of parameters and the modeled forward/aft vehicle acceleration. At 420, the computing system 204 determines whether the determined shift quality rating satisfies a shift quality rating threshold. When false, the method 400 returns to 416. When true, the method 400 proceeds to 428 where the computing system 204 optionally calibrates the controller 136 via the interface 208 (e.g., uploads clutch torque and/or slip profiles) for storage and future usage in controlling gear shift events of the transmission 104. The method 400 then ends or returns to 404 for one or more additional cycles (e.g., remodeling of the same gear shift event or modeling of another shift event between different gear ratios).

As previously discussed, the above-described method 400 could be similarly performed by the simulation system 202. In this manner, the total amount of slip within a simulated transmission/driveline can be adjusted to simulate the effect of the composite slip on the gear ratio gradient. The source of the slip (e.g., clutch slip vs. torque converter slip) is not important but rather the total slip within the simulated transmission/driveline. Using this simulation process, a desired slip for a transmission clutch to achieve an acceptable amount of jerk during a gear shift event can be determined. From this desired slip, a hydraulic pressure for controlling the transmission clutch can be determined. This process can be repeated to identify high quality shifts for any simulated transmission/vehicle configuration. In addition, it could be determined that a particular transmission/vehicle configuration is able to produce better quality shifts than other transmission/vehicle configurations, which could result in a change to a previously selected transmission/vehicle configuration.

It will be appreciated that the terms "controller" and "computing system" as used herein refer to any suitable control device or set of multiple control devices or any suitable computing system or set of multiple computing systems that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller and/or the computing system to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A calibration system for an automatic transmission of a vehicle, the calibration system comprising:
   an interface configured for communication with a controller of the vehicle, the controller being configured to control the transmission of the vehicle; and
   a computing system connected to the interface and configured to:
      obtain a set of parameters for a modeled gear shift event of the transmission, the set of parameters being indicative of at least interactions between on-coming and off-going clutches of the transmission during the modeled gear shift event;
      based on the set of parameters, model forward/aft vehicle acceleration caused by the modeled gear shift event;
      using a shift quality rating system, determine a shift quality rating of the modeled gear shift event based on at least one of the set of parameters and the modeled forward/aft vehicle acceleration;
      determine whether the determined shift quality rating satisfies a shift quality rating threshold; and
      when the determined shift quality rating satisfies the shift quality rating threshold, calibrate, via the interface, at least one of clutch torque and slip profiles for controlling on-coming and off-going clutches of the transmission during gear shift events based on the set of parameters for the modeled shift event.

2. The calibration system of claim 1, wherein the set of parameters comprises a gear ratio gradient indicative of a slope or rate of change of the gear ratio of the transmission during an inertia phase of the modeled gear shift event.

3. The calibration system of claim 2, wherein the computing system is further configured to determine whether the modeled forward/aft vehicle acceleration satisfies a vehicle acceleration threshold indicative of an acceptable amount of jerk during the modeled gear shift event.

4. The calibration system of claim 3, wherein the computing system is further configured to:
   when the modeled forward/aft vehicle acceleration satisfies the vehicle acceleration threshold, determine the shift quality rating of the gear shift event; and
   when the modeled forward/aft vehicle acceleration fails to satisfy the vehicle acceleration threshold, modify the set of parameters including at least decreasing the gear ratio gradient for the modeled gear shift event and then remodel the forward/aft vehicle acceleration.

5. The calibration system of claim 4, wherein the computing system is further configured to remodel the forward/aft vehicle acceleration based on the modified set of parameters when the determined shift quality fails to satisfy the shift quality rating threshold.

6. The calibration system of claim 1, wherein the computing system is configured to model the forward/vehicle acceleration caused by the modeled gear shift event by:
   based on the set of parameters, modeling a three-dimensional powertrain acceleration caused by the modeled gear shift event; and
   projecting the modeled three-dimensional powertrain acceleration onto a forward-motion vehicle direction vector to obtain the modeled forward/aft vehicle acceleration.

7. The calibration system of claim 6, wherein the computing system is configured to model the three-dimensional powertrain acceleration based further on a known powertrain mounting and driveline architecture of the vehicle.

8. The calibration system of claim 1, wherein the set of parameters are also indicative of a behavior of a torque converter during the modeled gear shift event, wherein the torque converter is configured to selectively couple a torque generating system of the vehicle to an input shaft of the transmission.

9. The calibration system of claim 1, wherein the shift quality rating system is a neural network based shift quality rating system.

10. A simulation system for modeling gear shift events of a simulated automatic transmission of a simulated vehicle, the simulation system comprising:

a shift quality rating system configured to determine a shift quality rating of a modeled gear shift event of the transmission; and a computing system configured to perform a simulation process to model a gear shift event of the transmission, the simulation process comprising:

obtaining, from a user, a set of parameters for the modeled gear shift event of the transmission, the set of parameters being indicative of at least interactions between on-coming and off-going clutches of the transmission during the modeled gear shift event and comprising at least a gear ratio gradient indicative of a slope or rate of change of the gear ratio of the transmission during an inertia phase of the modeled gear shift event;

based on the set of parameters, modeling forward/aft vehicle acceleration caused by the modeled gear shift event;

obtaining, from the shift quality rating system, a shift quality rating of the modeled gear shift event based on at least one of the set of parameters and the modeled forward/aft vehicle acceleration;

determining whether the determined shift quality rating satisfies a shift quality rating threshold; and when the determined shift quality rating fails to satisfy the shift quality rating threshold, adjusting the gear ratio gradient and repeating the simulation process until the determined shift quality rating satisfies the shift quality rating threshold.

11. The simulation system of claim 10, wherein the simulation process further comprises determining whether the modeled forward/aft vehicle acceleration satisfies a vehicle acceleration threshold indicative of an acceptable amount of jerk during the modeled gear shift event.

12. The simulation system of claim 11, wherein the simulation process further comprises:

when the modeled forward/aft vehicle acceleration satisfies the vehicle acceleration threshold, determining the shift quality rating of the gear shift event; and when the modeled forward/aft vehicle acceleration fails to satisfy the vehicle acceleration threshold, modifying the set of parameters including at least decreasing the gear ratio gradient for the modeled gear shift event and then remodel the forward/aft vehicle acceleration.

13. The simulation system of claim 12, wherein the simulation process comprises remodeling the forward/aft vehicle acceleration based on the modified set of parameters when the determined shift quality fails to satisfy the shift quality rating threshold.

14. The simulation system of claim 10, wherein modeling the forward/vehicle acceleration caused by the modeled gear shift event comprises:

based on the set of parameters, modeling a three-dimensional powertrain acceleration caused by the modeled gear shift event; and projecting the modeled three-dimensional powertrain acceleration onto a forward-motion vehicle direction vector to obtain the modeled forward/aft vehicle acceleration.

15. The simulation system of claim 14, wherein modeling the three-dimensional powertrain acceleration is based further on a powertrain mounting and driveline architecture of the vehicle.

16. The simulation system of claim 10, wherein the set of parameters are also indicative of a behavior of a simulated torque converter during the modeled gear shift event, wherein the torque converter is configured to selectively couple a torque generating system of the vehicle to an input shaft of the transmission.

17. The simulation system of claim 10, wherein the shift quality rating system is a neural network based shift quality rating system.

* * * * *